United States Patent [19] [11] Patent Number: 4,987,510
Schewe et al. [45] Date of Patent: Jan. 22, 1991

[54] THIN FILM MAGNET HEAD FOR VERTICAL MAGNETIZATION

[75] Inventors: Herbert Schewe, Herzogenaurach; Dietrich Stephani, Bubenreuth, both of Fed. Rep. of Germany

[73] Assignee: Siemens Aktiengesellschaft, Berlin and Munich, Fed. Rep. of Germany

[21] Appl. No.: 282,390

[22] Filed: Dec. 9, 1988

[30] Foreign Application Priority Data

Dec. 11, 1977 [DE] Fed. Rep. of Germany ....... 3742136

[51] Int. Cl.$^5$ .............................................. G11B 5/147
[52] U.S. Cl. ...................................... 360/126; 360/125
[58] Field of Search .................................. 360/125, 126

[56] References Cited

U.S. PATENT DOCUMENTS

| 2,596,912 | 5/1952 | Nygaard | 179/100.2 |
| 4,277,809 | 7/1981 | Fisher et al. | 360/131 |
| 4,575,777 | 3/1986 | Hosokawa | 360/123 |
| 4,580,178 | 4/1986 | Wuori et al. | 360/67 |
| 4,710,838 | 12/1987 | Jahnke | 360/125 |
| 4,782,416 | 11/1988 | Hillenbrand et al. | 360/125 |

FOREIGN PATENT DOCUMENTS

| 0012912 | 7/1980 | European Pat. Off. |
| 0166818 | 1/1986 | European Pat. Off. |
| 896122 | 11/1953 | Fed. Rep. of Germany |
| 58-218021 | 12/1983 | Japan |

OTHER PUBLICATIONS

IEEE Transactions on Magnetics: vol. Mag-11, No. 6, (Nov. 1985), pp. 1692-1696; vol. Mag-19, No. 5, (Sep. 1983), pp. 1611-1613; Mag-21, No. 5, (Sep. 1985), pp. 1338-1343; vol. Mag-16, No. 1, (Jan. 1980), pp. 114-119; vol. Mag-14, No. 5, (Sep. 1978), pp. 849-851; vol. Mag-16, No. 1, (Jan. 1980), pp. 71-76; vol. Mag-20, No. 5, (Sep. 1984), pp. 657-662 and pp. 675-680; vol. Mag-23, No. 1, (Jan. 1987), pp. 177-179.

Primary Examiner—A. J. Heinz
Assistant Examiner—Jeff Evans
Attorney, Agent, or Firm—Kenyon & Kenyon

[57] ABSTRACT

The thin film magnet head is to be guided over a recording medium to be magnetized perpendicularly, in which flux changes are to be registered along a track with a predetermined record wavelength and flux change density. The magnet head contains a flux-carrying, ring head-like guiding element with two magnet legs which constitute magnet poles which are arranged one behind the other and separated by a gap of predetermined width and having predetermined extents in the movement direction. With this magnet head the expanse for signal processing in a write/read channel is to be reduced. The magnet head fulfills this end by at least approximately satisfying the following relation:

$$\lambda^* = g + \max(A_1, A_2)$$

$\lambda^*$ being the record wavelength which results for the value $D_p$ of the flux change density at which the read voltage of the magnet head is maximum; g, the width of the gap; and $\max(A_1, A_2)$ the greater value of the two extents ($A_1$, $A_2$) of the magnet poles.

7 Claims, 2 Drawing Sheets

THIN FILM MAGNET HEAD FOR VERTICAL MAGNETIZATION

BACKGROUND OF THE INVENTION

The present invention relates to a thin film magnet head which is to be guided over a recording medium to be magnetized perpendicularly in which flux changes are to be registered along a track with predetermined record wavelength and flux change density, and which contains a flux-carrying head-like guiding element with two magnet legs. These magnet legs constitute magnet poles facing the recording medium which are arranged one behind the other seen in the direction of relative movement of the magnet head with respect to the recording medium, spaced by a gap of predetermined width, and which have predetermined extents in the direction of movement, and outside the region of the magnet poles they define an interstice through which extend the turns of at least one write and/or read coil winding. Such a magnet head is shown, e.g. in EP-A-No. 0 012 912.

The principle of perpendicular magnetization for storage of data in appropriate recording media is generally known (cf. e.g. "IEEE Transactions on Magnetics", Vol. MAG-16, No. 1, January, 1980, pages 71 to 76, or Vol. MAG-20, No. 5, September, 1984, pages 657 to 662 and 675 to 680). The recording media to be provided for use with this principle, often referred to as vertical magnetization or vertical data storage, may be present in particular in the form of rigid magnetic memory plates. Such a recording medium has at least one memory layer of predetermined thickness, to be magnetized accordingly, made of a material with vertical magnetic anisotropy, the axis of the so-called easy magnetization of this layer being oriented perpendicular to the surface of the recording medium. Preferred as a memory material is CoCr (cf., e.g., "IEEE Transactions on Magnetics", Vol. MAG-14, No. 5, September, 1978, pages 849 to 851). By means of special magnet heads, the individual data can then be registered along a track as bits in successive sections by appropriate remagnetization of the memory layer in the form of flux changes. The bits or flux changes have a predetermined extent in the longitudinal direction of the track, referred to also as record wavelength. This extent may be substantially smaller for vertical magnetization than for storage according to the known principle of longitudinal (horizontal) magnetization, where reduction of the record wavelength is limited by the demagnetization of the material. That is, by perpendicular magnetization, the data density can be increased as compared with longitudinal magnetization.

Now if one guides a thin film magnet head of the initially mentioned kind along a track over a record medium in which magnetic flux changes have been registered by vertical magnetization, a predetermined read voltage can be produced with this head. This read voltage depends on the number of flux changes per unit length of the track, i.e., on the flux change density. A corresponding curve of the read voltage as a function of this flux change density in a diagram is known as a roll-off curve. Now it is found that with known thin film magnet heads this curve assumes for a certain value of the flux change density a marked maximum value $D_p$ and drops sharply with further increase of the flux change density (cf., e.g., "IEEE Transactions on Magnetics", Vol. MAG-23, No. 1, January, 1987, pages 177–179). This decrease of the read voltage can be explained by a superposition (interference) of the bipolar read signals—progressing with increasing flux change density—which one obtains when reading a single flux change.

Because of this marked dependence of the read voltage on the flux change density, in particular in the range of the maximum value $D_p$, the expense for signal processing in a read/write channel of the magnet head of the initially mentioned kind is correspondingly great.

SUMMARY OF THE INVENTION

It is, therefore, an object of the present invention to reduce the above expense.

The above and other objects of the invention are achieved by a thin film magnet head which is to be guided over a recording medium to be magnetized perpendicularly in which flux changes are to be registered along a track with a predetermined record wavelength and flux change density, and which contains a flux-carrying, ring head-like guiding element with two magnet legs which constitute two magnet poles facing the recording medium which are arranged one behind the other as seen in a relative movement direction of the magnet head with respect to the record medium, spaced by a gap of predetermined width, and have predetermined extents in the direction of movement, and define outside the region of the magnet poles an interstice through which extend the turns of at least one write and/or read coil winding, the following relation being at least approximately fulfilled:

$$\lambda^* = g + \max(A_1, A_2),$$

where $\lambda^*$ is the record wavelength which results for the value $D_p$ of the flux change density for which the read voltage at the read coil winding is maximum, g is the width of the gap, and $\max(A_1, A_2)$ is the greater value of the two extents ($A_1$, $A_2$) of the magnet poles.

The advantages connected with such a design of the magnet head are to be seen in particular in that its roll-off curve shows a very flat course over a large range of the flux change density. The signal processing expense is limited accordingly.

BRIEF DESCRIPTION OF THE DRAWINGS

The invention will be described in greater detail in the following detailed description with reference to the drawings, in which.

DETAILED DESCRIPTION

Figure 1:
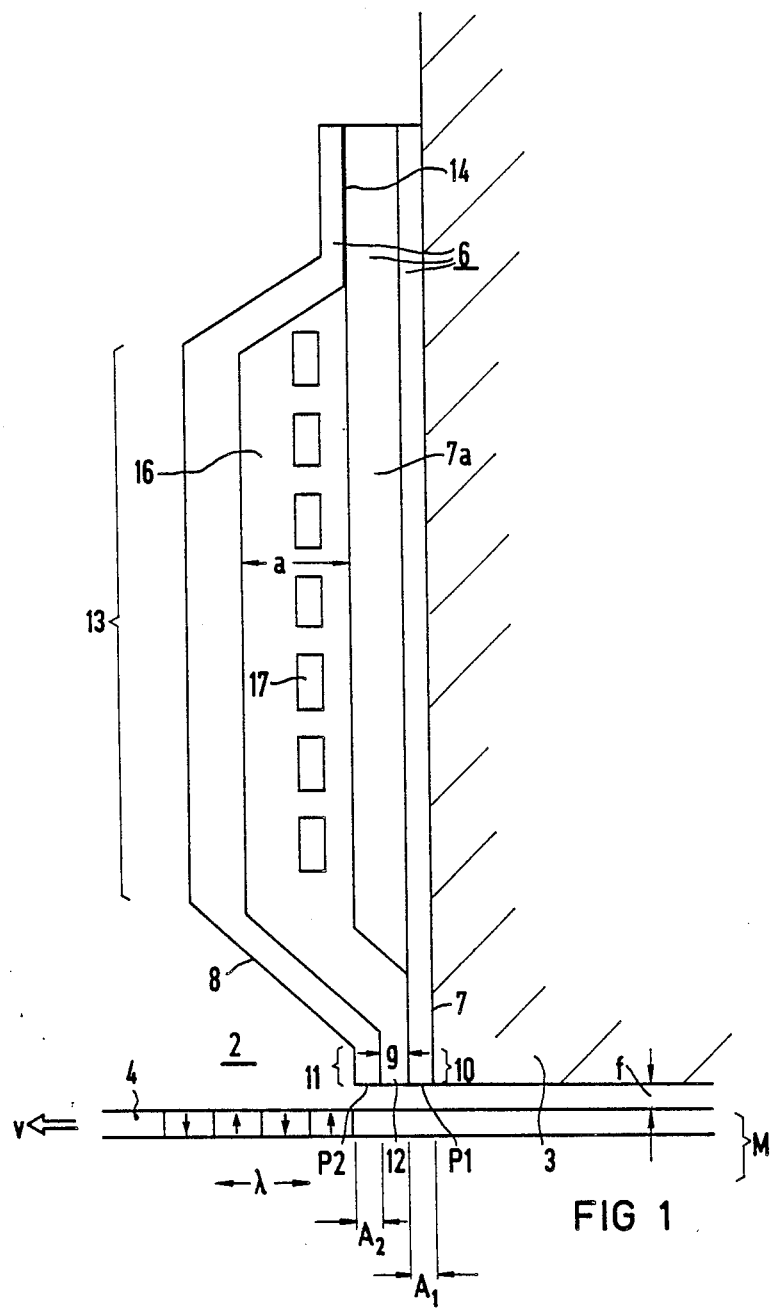
FIG. 1 is a schematic drawing of a thin film magnet head according to the invention.

For the thin film magnet head illustrated only partially in a longitudinal section in FIG. 1, for writing and reading, ring head-like forms known per se with layerwise construction are taken as the basis for the principle of perpendicular (vertical) magnetization (cf. e.g. the cited EP-A-No. 0 012 912 or EP-A-No. 0 166 818). The head, labeled 2 as a whole in the figure, is deposited by a known thin film technique on the flat side of a substrate 3. This flat side forms, e.g., the back of a customary element, referred to as flying body, which is not set forth in detail in the figure. The magnet head 2 is to be guided aerodynamically relative to a recording medium M known per se, to be magnetized vertically, at a low height of flight f, of, for example, less than 0.2 μm along a track. The direction of relative motion with respect to the head, of the recording medium rotating past it, for example, under it, is indicated by an arrow line marked v.

The recording medium, in particular a magnetic memory plate, has a memory layer 4 for example consisting of a CoCr alloy which, if desired, may be connected on its side away from the magnet head with further layers as, e.g., of a specific NiFe alloy. In the figure, some flux changes registered in the memory layer 4 along a track are indicated, which occupy in the movement direction a predetermined length of the track. This record wavelength to be correlated with a flux change is marked λ.

The magnet head 2 contains a flux-carrying, ring head-like guiding element 6 with two magnet legs 7 and 8. These legs are oriented at least approximately perpendicular to the surface of the recording medium, to a large extent and in particular in the region of their end pieces 10 and 11 toward the recording medium M, forming there a magnet pole P1 and P2, respectively. The extent of the end pieces 10 and 11 in the region of these poles P1 and P2 relative to the movement direction v is designated by $A_1$ and $A_2$, respectively. At least the extent $A_1$ of the leading magnet pole P1 viewed in movement direction v may be advantageously between 0.3 μm and 3 μm. The corresponding extent $A_2$ of magnet pole P2 is generally of the same order of magnitude, with $A_1$ and $A_2$ possibly having different values. Formed between the two poles P1 and P2 is an air gap 12 with an advantageously small longitudinal width g pointing, that is, in the movement direction, of less than 1 μm, in particular less than 0.3 μm. In a central region 13 of the ring head-like guiding element 6 the distance between the two magnet legs 7 and 8 is increased as compared with this gap width, in that, e.g., the rear (lagging) magnet leg 8 with respect to the movement direction v leads in this region to a larger distance a with respect to the front magnet leg 7 which is flat and turned toward the substrate 3. Outside of this region 13, on the side of the guiding element 6 away from the recording medium M, the magnet leg 8 is joined to the magnet leg 7 via magnetic reinforcement layer 7a in known manner in a connection region 14, so that then there results the ring head-like form of the guiding element 6. Extending through the interstice 16 thus existing between the two magnet legs 7 and 8 in the central region 13 is at least one flat coil winding 17, which can serve both as writing and as reading coil. This coil winding, only indicated in the figure, generally has one or more courses (layers) with a relatively large number of turns.

Figure 2:
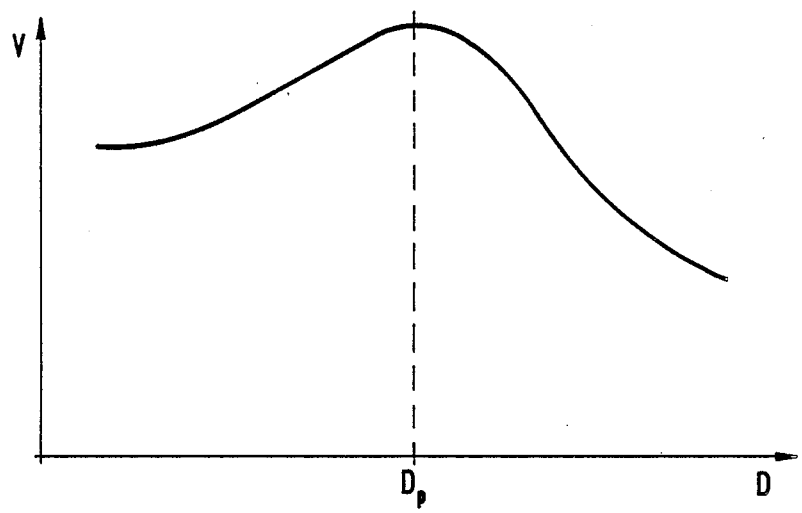
FIG. 2 shows a roll-off curve for a known thin film magnet head, the track widths of which are evident from FIG. 3.

Proceeding on the basis of corresponding known ring head-like design forms of thin film magnet heads for vertical magnetization, one obtains in particular in the case of a recording media with a CoCr memory layer generally a roll-off curve as shown schematically in the diagram of FIG. 2. In this diagram are plotted on the ordinate the read voltage V and on the abscissa the flux change density D in arbitrary units. The curve is obtained by registering along a track flux changes with varying record wavelength and then measuring the associated read voltage. At a certain value $D_p$ of the flux change density D there will then appear an undesired marked maximum of the read voltage V.

With the design specification according to the invention it can now be achieved that this maximum of the read voltage is at least largely eliminated.

Figure 3:
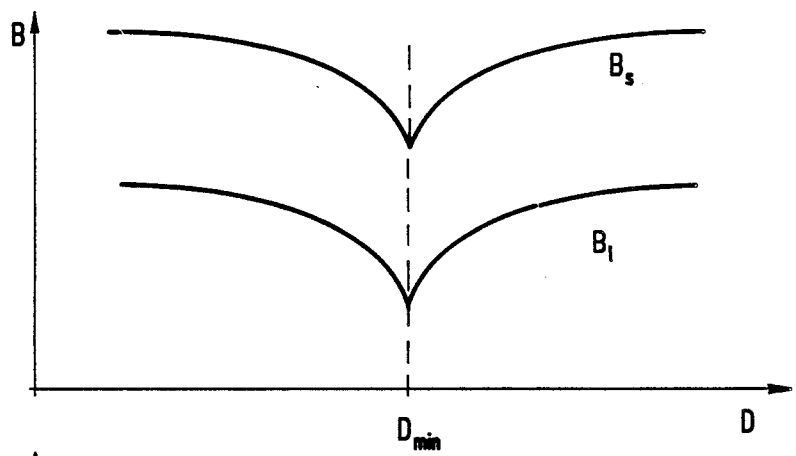
FIG. 3 shows the track widths for the thin film head of FIG. 2.

What is taken as a basis here is the observation that in the known thin film magnet heads with a ring head-like shape of their magnetic guiding elements the effective track widths also depend on the flux change density D both in the read function and in the write function. This fact is shown schematically in the diagram of FIG. 3. The flux change density D is plotted on the abscissa and the effective track widths B are plotted on the ordinate in arbitrary units. As is evident both from the course of curve $B_l$ for the read width and from the course of curve $B_s$ for the write width, at a certain value $D_{min}$ the effective track widths assume a minimum value. This means that interferences occur. Maximum extinction is obtained when on the pole faces of poles P1 and P2 toward the recording medium M zones of equal phase and equal amplitude are brought to interference in the magnet head. In fact, in the end pieces 10 and 11 of the magnet head the flux concentration is not constant over the respective cross section; i.e., the end pieces 10 and 11 have zones with different read sensitivity. As a result, in particular the interference condition with respect to equal phase and equal amplitude is fulfilled predominantly in the edge regions of the head, and thus the effective track width is reduced accordingly. A first destructive interference for which said interference condition is fulfilled occurs at the flux change density $D_{min}$ per FIG. 3 when $$\lambda = \lambda^* = g + \max(A_1, A_2).$$

At interferences of higher order, also regions of the pole end pieces located farther inward, i.e. closer to the gap, with a high read sensitivity, can contribute to the extinction, drastically reducing the track width.

As the read voltage V is directly proportional to the read track width, a flat course of the roll-off curve is obtained when the condition $$D_p \approx D_{min}$$

is fulfilled. This condition, however, is not fulfilled in known thin film magnet heads.

Figure 4:
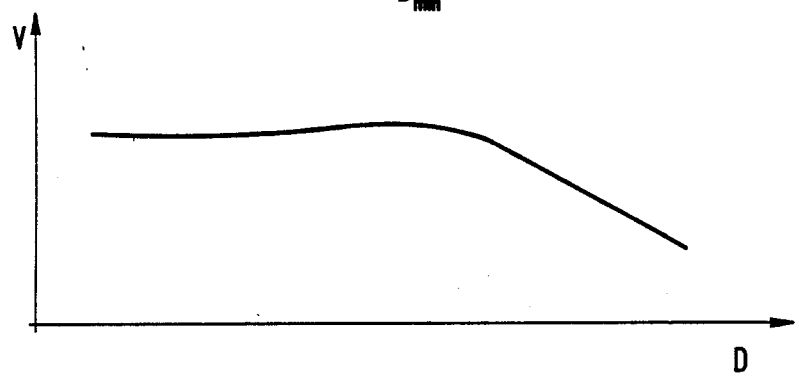
FIG. 4 shows the roll-off curve for a magnet head according to the invention.

If one adopts the mentioned condition for a magnet head according to the initially defined manner, there results then a course of the roll-off curve as it becomes evident from the diagram of FIG. 4. That is, according to the invention, the record wavelength $\lambda^*$ is determined from the value $D_p$ to be determined experimentally. This special record wavelength $\lambda^*$ then establishes, in accordance with the equation $\lambda^* = g + \max(A_1, A_2)$, the magnitudes of the gap width g and of the pole extent $A_1$ or $A_2$.

According to a concrete example of a thin film magnet head according to the invention with a construction per FIG. 1, the following dimensions are provided:

$A_1 = 1$ um,
$A_2 = 0.6$ um,
$g = 0.2$ um.

For $D_{min}$ there then results a value of 43 kfci.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A thin film magnet head adapted to be guided over a recording medium to be magnetized perpendicularly in which medium flux changes are to be registered along a track with a predetermined record wavelength and flux change density, the head comprising a flux-carrying, ring head-like guiding element having two magnet legs, said magnet legs having magnet poles facing the recording medium which are arranged one behind the other as seen in a relative movement direction of the magnet head with respect to the recording medium, said poles spaced by a gap of predetermined width, and having predetermined extents in the direction of movement, said magnet legs defining outside the region of the magnet poles an interstice through which interstice extend the turns of at least one write and/or read coil winding, the following relation being at least approximately fulfilled:

$$\lambda^* = g + \max(A_1, A_2),$$

where
$\lambda^*$ is the record wavelength which results for the value $D_p$ of the flux change density for which a read voltage at the read coil winding is maximum, g is the width of the gap and $\max(A_1, A_2)$ is the greater value of the two extents $(A_1, A_2)$ of the magnet poles.

2. The magnet head recited in claim 1, wherein the width of the gap is less than 1 μm.

3. The magnet head recited in claim 2 wherein the width of the gap is less than 0.3 μm.

4. The magnet head recited in claim 1, wherein the extent ($A_1$) of the leading magnet pole, seen in the direction of relative movement, is between 0.3 μm and 3 μm.

5. The magnet head recited in claim 4, wherein the extents ($A_1$, $A_2$) of the magnet poles are different in size.

6. The magnet head recited in claim 1, wherein the extent ($A_2$) of the lagging magnet pole, seen in the direction of relative movement, is between 0.3 μm and 3 μm.

7. The magnet head recited in claim 6, wherein the extents ($A_1$, $A_2$) of the magnet poles are different in size.

* * * * *